Figure 1:
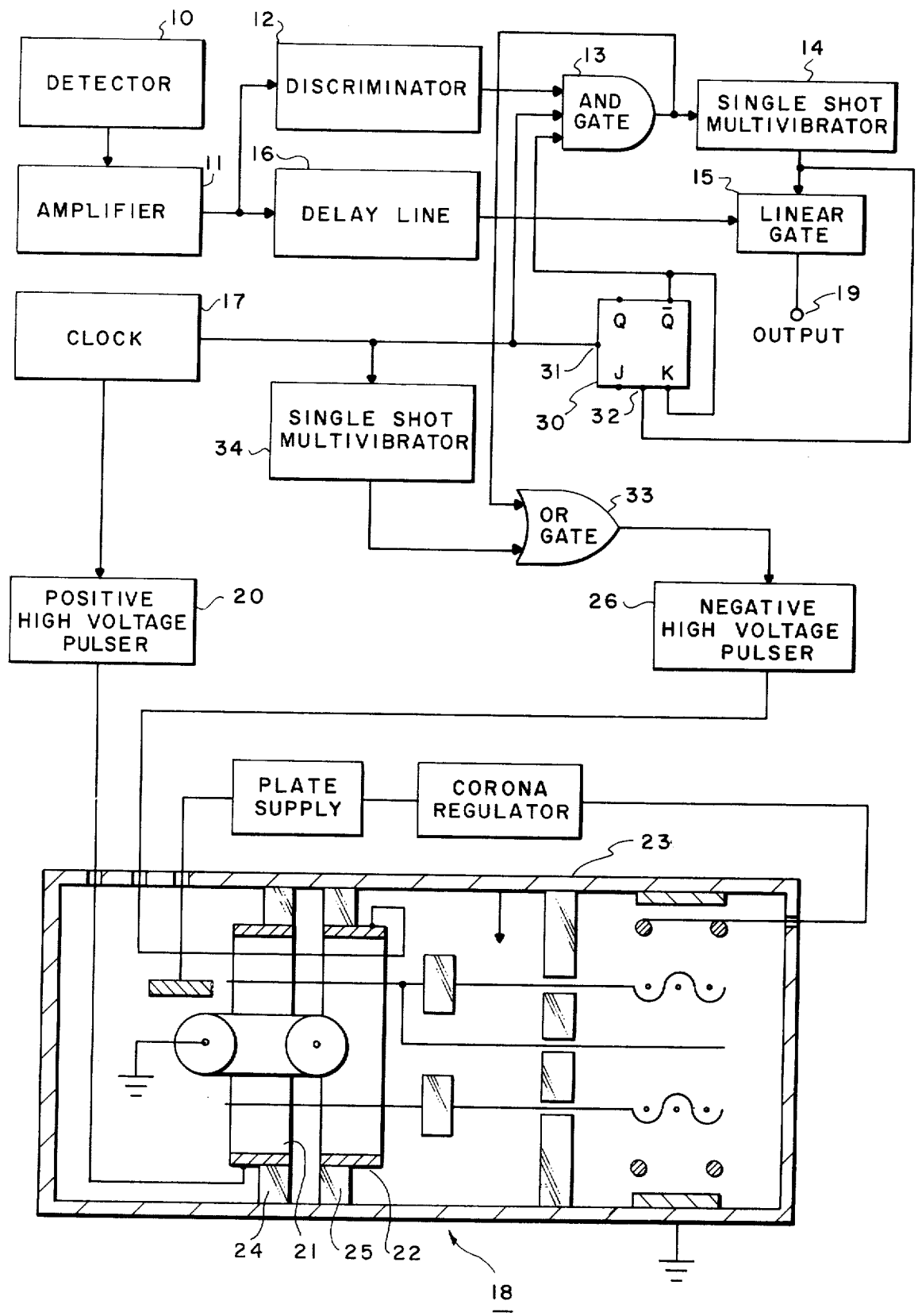

United States Patent [19]
Culver

[11] 3,885,154
[45] May 20, 1975

[54] METHOD AND APPARATUS FOR REDUCING BACKGROUND IN INELASTIC GAMMA RAY LOGGING SYSTEMS

[75] Inventor: Richard B. Culver, Houston, Tex.

[73] Assignee: Dresser Industries, Inc., Dallas, Tex.

[22] Filed: Oct. 26, 1973

[21] Appl. No.: 410,071

[52] U.S. Cl................................ 250/267; 250/502
[51] Int. Cl. ........................................... G01t 1/30
[58] Field of Search............................ 250/267, 502

[56] References Cited
UNITED STATES PATENTS

| | | | |
|---|---|---|---|
| 3,146,351 | 8/1964 | Hoyer | 250/502 |
| 3,461,291 | 8/1969 | Goodman | 250/502 |
| 3,686,503 | 8/1972 | Givens | 250/269 |

Primary Examiner—Harold A. Dixon
Attorney, Agent, or Firm—William E. Johnson, Jr.

[57] ABSTRACT

The amplified pulses from a radioactivity detector are coupled through a delay line to a linear gate. The amplified pulses from the detector are also connected to a discriminator. The output of the discriminator is AND gated in a logical gate with a clock pulse which is synchronized with a high energy neutron source. The AND gate triggers a first single shot multivibrator which in turn triggers the linear gate. The delay line allows for the time required for the detector pulse to rise to the discriminator threshold and for the propagation delay in the logic circuitry. The linear gate opens before the arrival of the detector pulse and closes after it passes through. A J-K flip-flop circuit is triggered by the trailing edge of the output of the first single shot multivibrator to disable the AND gate, thus causing the linear gate to pass only the first detected pulse having the necessary discriminator level. The output of the AND gate is OR gated with the output of a second single shot multivibrator which is triggered off the trailing edge of the clock pulse. The output of the OR gate drives a negative high voltage pulser which is connected to a negative pulsing ring in a neutron generator. The leading edge of the clock pulse drives a positive high voltage pulser which is connected to a positive pulsing ring in the neutron generator. The neutron generator is thus extinguished upon the detection of the first detector pulse occurring within the clock pulse interval having the necessary discriminator threshold. In an alternative embodiment, a second AND gate is used to gate a source control clock pulse and the output from the J-K flip-flop to provide a driving pulse for the ion source pulser.

3 Claims, 5 Drawing Figures

3,885,154

METHOD AND APPARATUS FOR REDUCING BACKGROUND IN INELASTIC GAMMA RAY LOGGING SYSTEMS

BACKGROUND OF THE INVENTION

This invention relates generally to the art of geophysical prospecting and more particularly to the art of radioactivity well logging involving the counting and spectral distribution of pulses resulting from the detection of such radioactivity.

This invention relates further to an improvement upon the system disclosed in my U.S. Pat. No. 3,739,172 relating to a CIRCUIT FOR IMPROVING DATA IN PULSE DETECTION SYSTEMS, issued on June 12, 1973, and assigned to the assignee of the present invention.

Those practicing the art of radioactivity well logging recognize that the presence of hydrocarbons can be determined by the detection of gamma rays produced by inelastic scattering of fast neutrons from carbon nuclei. This is accomplished, generally, by pulsing a fast neutron source and a gamma ray spectrometer coincidentally. To prevent contamination of the measurement by capture and activation gamma rays, it is necessary to use a relatively short neutron generation and detection period.

Since hydrogen is prevalent in oil well environments, the fast neutrons are rapidly thermalized and then captured, either by hydrogen or one of the other commonly occurring earth elements. Experiments have shown that inelastic measurements are appreciably contaminated by capture gamma rays if the generation and detection interval is much longer than about 10 microseconds. Also, to minimize the capture component, the repetition rate should allow capture gamma rays resulting from the preceding neutron burst to die away before another burst occurs. The latter criterion is not consistent with well logging requirements which demand a system capable of statistically accurate measurement while traversing a borehole at a reasonable speed.

It is therefore the primary object of the present invention to provide a method and apparatus to reduce the capture gamma ray background without reducing the inelastic gamma production.

This and other objects of the present invention are accomplished, generally, by method and apparatus which turn off the neutron source as a function of the detected radiation.

Figure 2:
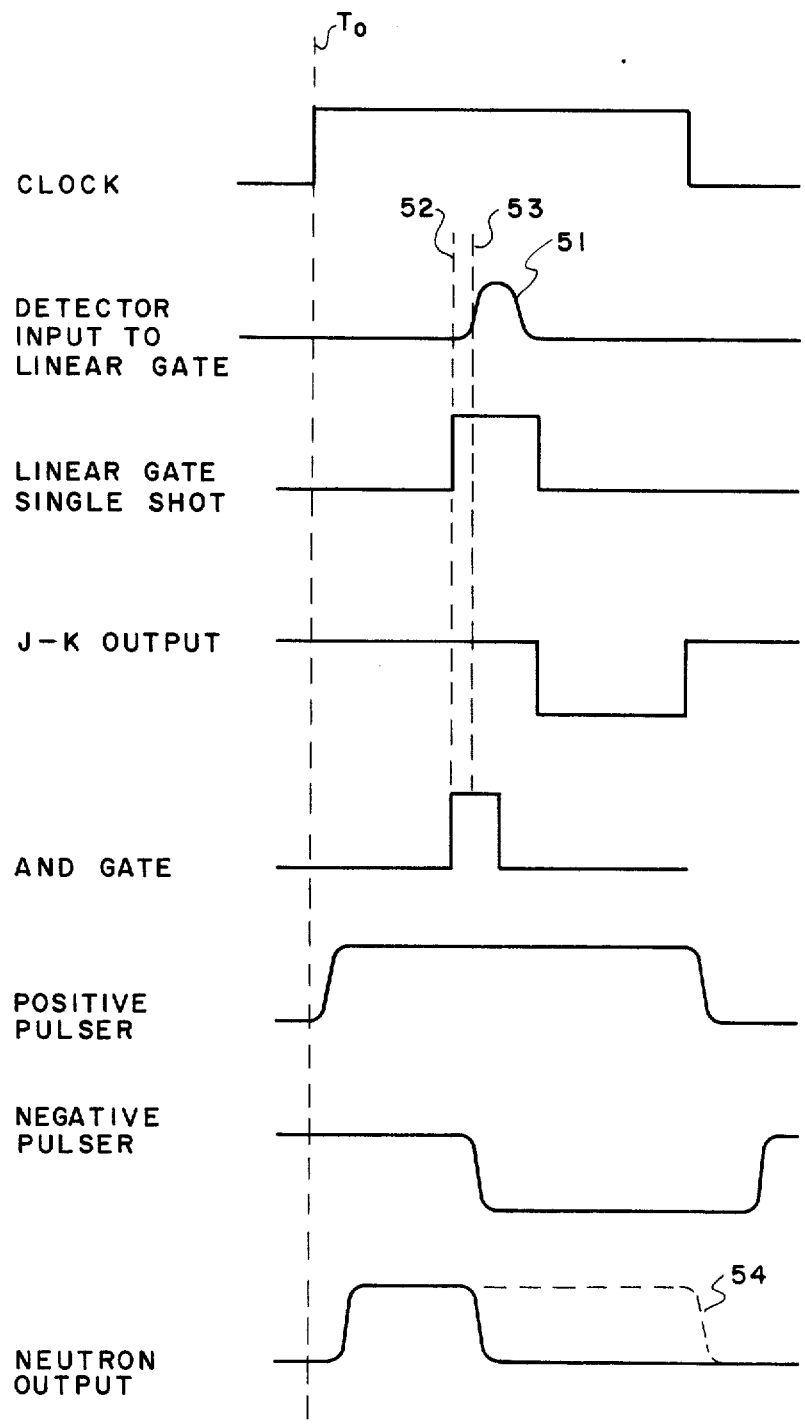
Figure 3:
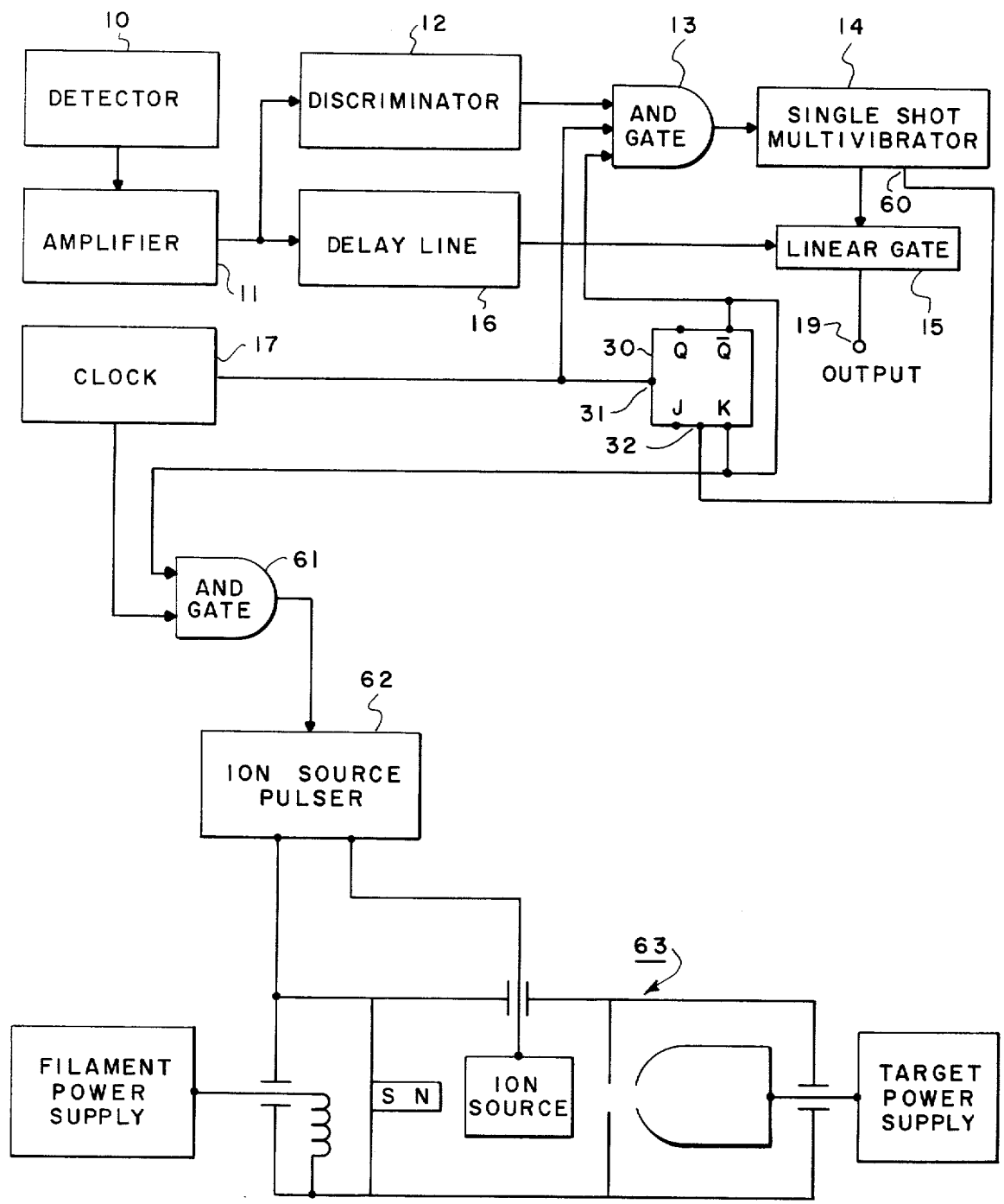
Figure 4:
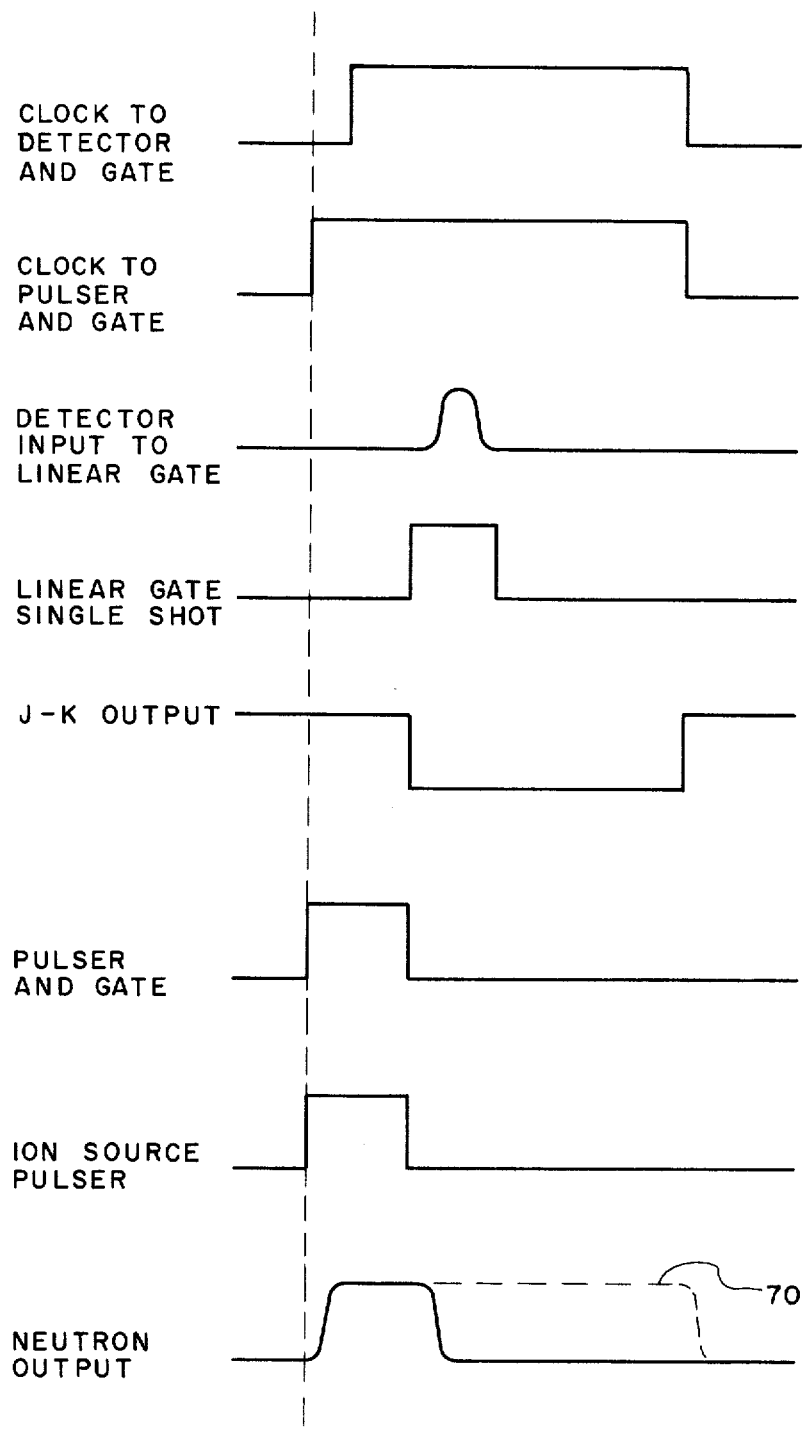
Figure 5:
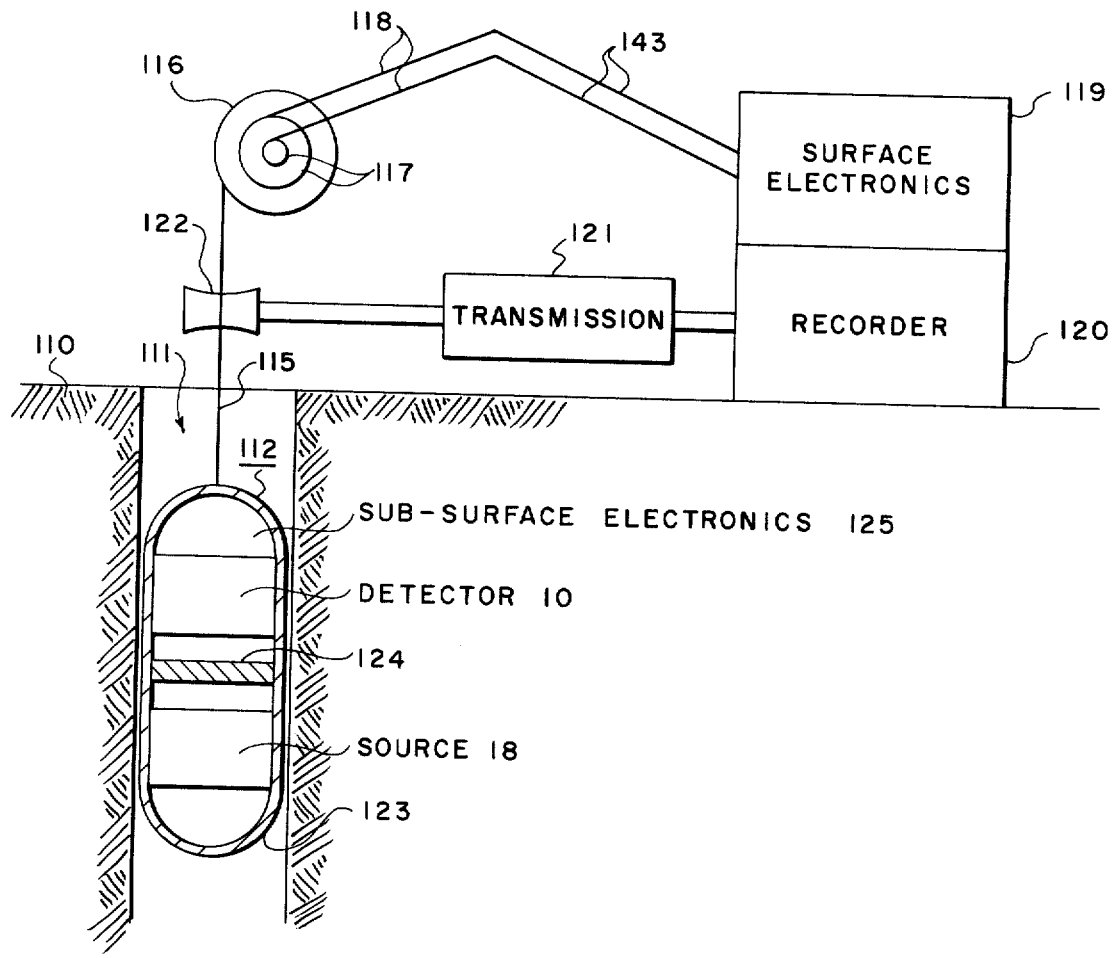

These and other objects, features and advantages of the invention will become apparent to those skilled in the art from the following detailed description, when considered with the accompanying drawing, in which:

FIG. 1 is a block circuit diagram of one embodiment of the invention;

FIG. 2 graphically illustrates various waveforms throughout the circuit of FIG. 1;

FIG. 3 is a block circuit diagram of an alternative embodiment of the invention;

FIG. 4 graphically illustrates various waveforms throughout the circuit of FIG. 3; and FIG. 5 is a diagrammatic, side elevational view of a radioactivity well logging operation according to the invention.

Referring to the drawing in more detail, and especially to FIG. 1, there is illustrated in block diagram a circuit which can be used to aid in reducing the background radiation within instrumentation which is used in conducting a radioactivity well survey.

The detector 10, which may be used in a well logging instrument as illustrated in FIG. 5, is a scintillation counter arranged for gamma ray spectral analysis in accordance with prior art. In the preferred embodiment, it is a NaI (Tl) crystal having a two inch diameter with a three inch length, such crystal being coupled to a Model No. 4518 photomultiplier tube available from the Radio Corporation of America. Such a crystal photomultiplier combination may have a resolution of 7.5 to 8.5 percent with a 660 kev cesium 137 peak. The output of the detector 10 is coupled into an amplifier 11 in the subsurface electronics section 125 of FIG. 5. The output of amplifier 11 is coupled through a discriminator 12 which in turn is coupled into one of the three inputs to the AND gate 13. The discriminator 12 is used to remove pulses having amplitudes below a selectable threshold value which might otherwise cause pile-up on the transmission line normally connected to the output terminal 19. A setting of 400 kev is generally suitable for this purpose. The output of the discriminator 12 is AND gated in the AND gate 13 with a voltage pulse having a nominal width of 10 microseconds from the clock and sequence circuit 17. The output of the AND gate 13 triggers a single shot multivibrator circuit 14 which is nominally set to have a 1.6 microsecond wide pulse output for controlling the linear gate 15. The clock 17 is also synchronized with the neutron source 18; the output of the clock is connected to a positive high voltage pulser 20 having its output in turn connected to a positive pulsing ring 21 on the interior of the neutron source 18. It should be appreciated that the neutron source 18 can be fabricated substantially in accordance with U.S. Pat. No. 3,309,522, assigned to the assignee of the present invention, and which is modified to the extent necessary to have the positive pulsing ring 21 and a negative pulsing ring 22. It should be appreciated that the ring 21 and the ring 22 are insulated from the grounded shield 23 by insulators 24 and 25, respectively.

Since the neutron source 18 is substantially described within the aforementioned U.S. patent, suffice it to say at this point that a pulse from the positive high voltage pulser 20 causes the neutron source to emit neutrons and a pulse from the negative high voltage pulser 26 causes the output of the neutron source to be extinguished.

The amplified pulses from the amplifier 11 are also coupled into the delay line 16, which is nominally set to cause a delay of .4 microseconds, the output of which is coupled into the linear gate 15. The third input to the AND gate 13 is connected to the $\overline{Q}$ output of the J-K flip-flop circuit 30. Such J-K flip-flop circuits are conventional and are discussed at length in U.S. Pat. No. 3,268,741. The steering terminal K is also connected to the $\overline{Q}$ output terminal. The output of the clock 17 is also connected to the "clear" input terminal 31 of the circuit 30. The clock pulse input terminal 32 of the J-K flip-flop circuit 30 (not to be confused with the clock 17) is connected to the output of the single shot multivibrator 14.

The output of the AND gate 13 is also connected to one of the two inputs of OR gate 33. The output of the clock 17 is also connected to the input of the single shot multivibrator 34 whose output is connected to the other input to the OR gate 33. The output of the OR gate 33 drives the negative high voltage pulser 26.

The operation of the circuit of FIG. 1 can best be explained by reference to FIG. 2, wherein various representative waveforms are graphically illustrated. Commencing at the point To, a clock pulse is generated by the clock 17 having a nominal duration of 10 microseconds. Assuming that a gamma ray pulse is detected during the clock interval, for example, at 4 microseconds after the leading edge of the clock pulse, the detector pulse 51 will be coupled from the delay line 16 into the linear gate 15. It should be appreciated that the linear gate 15 is opened by a period of time equal to the delay of the delay line 16, represented by the time distance between the dotted lines 52 and 53, prior to the arrival of the detected pulse 51 at the linear gate 15. Since the detector portion of the circuit is like that of my aforementioned U.S. Pat. No. 3,739,172, no further operational detail need be described herein.

Once the detected pulse has been detected, the output of the AND gate 13 is coupled into the OR gate 33. Thus, the negative high voltage pulser is arranged to create a negative high voltage pulse upon the occurrence of a detected pulse during the clock interval or at the conclusion of the clock pulse from the clock 17. Thus, the neutron source 18 is activated upon the leading edge of the clock pulse by action of the output of the positive high voltage pulser and is extinguished upon the occasion of either the trailing edge of the clock pulse (assuming no occurrence of a detected pulse) or upon the earlier occurrence of a detected pulse.

In reviewing the advantages of the present invention, it should be appreciated that it has been known to use a fast neutron source producing bursts of neutrons 10 microseconds in width at a repetition rate of 10 kilocycles per second and a gamma ray spectrometer gated in coincidence with the neutron source. If the neutron bursts are rectangular (that is, equal numbers of neutrons produced during equal time intervals), on the average, half the inelastic gamma rays incident on the detector occur during the first 5 microseconds of the neutron bursts. If the system dead time is greater than the detector on time, any more than one inelastic gamma ray per neutron burst incident upon the detector is wasted or produces pile-up in the system. Also, the fast neutrons producing such gamma rays produce the capture gamma rays which comprise the unwanted background. Thus, by turning the neutron source off at the instant the first gamma ray is detected in the detection interval, the background can be substantially reduced.

This advantage is best illustrated in the graphic representation in FIG. 2 of the neutron output wherein the dotted line curve 54 illustrates that portion of the neutron output which would have been generated subsequent to the detected pulse except for the present invention and which would have contributed to the background information within the system.

Referring now to FIG. 3, there is illustrated an alternative embodiment of the present invention wherein a substantial portion of the detector circuit is identical to that illustrated with respect to FIG. 1. However, the circuit is modified to the extent that the output 60 of the single shot multivibrator 14 causes the J-K flip-flop circuit 30 to change state on the leading edge of the single shot output pulse. This modification does not change the total operation of the circuit but does enable it to be used for extinguishing the neutron source with a minimum amount of additional circuitry. A second AND gate 61 is used to gate a source control clock pulse from the clock 17 and the output from the J-K flip-flop to provide a driving pulse for the ion source pulser 62. The ion source 63 is of the type which is directly controllable and is commercially available, for example, from the Phillips Research Laboratories, Eindhoven, Netherlands.

The operation of the circuit of FIG. 3 can best be illustrated by reference to the waveforms which are graphically illustrated in FIG. 4. The clock pulse to the pulser AND gate 61 is illustrated as commencing approximately 1 microsecond prior to the clock pulse to the detector AND gate 13. This is done for practical considerations due to the inherent nature of some ion sources wherein the source does not commence to produce neutrons immediately upon the existence of an ion source pulse. The source is synchronized with the detector system so that it begins to emit neutrons approximately in coincidence with the clock pulse to the AND gate 13 and ceases to emit neutrons either when the first gamma ray exceeding the discriminator threshold and falling within the 10 microsecond detection gate is detected by the detection system, or, if no pulse is detected, at the end of the 10 microsecond gating interval. It should be appreciated, that as with the embodiment of FIG. 1, only a single detected pulse is utilized within the gating interval and in addition, the neutron source is cut off almost immediately upon the detection of a detected gamma ray. The dotted line portion 70 in FIG. 4 illustrates the portion of the neutron output eliminated by the present invention.

Referring now to FIG. 5, there is illustrated schematically a radioactivity well surveying operation in which a portion of the earth 110 is shown in vertical section. The well 111 penetrates the earth's surface and may or may not be cased. Disposed within the well is subsurface instrument 112 of the well logging system. Subsurface instrument 112 comprises a detector 10 and a neutron source 18 as discussed above with respect to FIG. 1. Cable 115 suspends the instrument in the well and contains the required conductors for electrically connecting the instrument with the surface apparatus. The cable is wound on or unwound from drum 116 in raising and lowering the instrument 112 to traverse the well.

In making a radioactivity log of a well, instrument 112 is caused to traverse the well. Thereby neutrons from source 18 irradiate the formations surrounding the borehole and radiations influenced by the formations are detected by the detector 10. The resultant signals are sent to the surface through cable 115. Through slip rings 117 and brushes 118 on the end of the drum, the signals may be conducted to the surface electronics 119, where such signals are processed and then recorded on the recorder as is well known in the art. Recorder 120 is driven through a transmission 121 by measuring reel 122 over which cable 115 is drawn so that recorder 120 moves in correlation with depth as instrument 112 traverses the well. The elements are shown diagrammatically, and it is to be understood that the associated circuits and power supplies are provided in a conventional manner. It is also to be understood that the instrument housing 123 will be constructed to withstand the pressures and mechanical and thermal abuses encountered in logging a deep well and provide adequate space within it to house the necessary apparatus and permit the transmission of radiation through it. It is also desirable to interpose between the neutron source 18 and detector 10 a neutron absorbing shield 124 which may be, for example, tungsten, copper or a hydrogenous material such as paraffin or a combination of such materials.

Thus it should be appreciated that there have been described herein the preferred embodiments of the present invention for either eliminating or materially reducing the background associated with the detection of inelastic gamma rays. However, it should also be appreciated that various modifications to these embodiments will occur to those skilled in the art and that such modifications are contemplated by the disclosure herein. For example, means other than the J-K flip-flop can be used to disable the particular neutron source being used, for example, various combinations of other logic gates. Furthermore, the detected radiation could be in some form other than gamma rays, for example, the detection of neutrons themselves. In a similar manner, the source can be turned off in response to some other detected entity, for example, the second gamma ray detected following the commencement of the burst of neutrons from the source.

The embodiments of the invention in which an exclusive property or privilege is claimed are defined as follows:

1. A method for providing a radioactivity log of a formation surrounding a borehole, comprising:
   irradiating said formation with at least one discrete burst of fast neutrons during a variable time period;
   detecting radiation occasioned in said formation by said fast neutrons; and
   limiting the number of fast neutrons generated in said at least one burst by shortening said time period as a function of said detected radiation.

2. The method according to claim 1 wherein said detected radiation is respectively a single gamma ray occurring subsequent to the commencement of each of said at least one burst of fast neutrons.

3. A method for logging the formations surrounding an earth borehole, comprising:
   initiating a burst of fast neutrons and irradiating said formations with said neutrons during a variable time period;
   detecting radiation occasioned in said formations as the result of said fast neutrons; and
   terminating said burst of fast neutrons by shortening said time period as a function of said detected radiation.

* * * * *